United States Patent
Barnett

(10) Patent No.: US 7,340,876 B1
(45) Date of Patent: Mar. 11, 2008

(54) CROP HARVESTING HEADER WITH ROTARY DISKS AND IMPELLERS FOR TRANSFERRING THE CROP INWARDLY TO A DISCHARGE OPENING

(75) Inventor: Neil Gordon Barnett, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 0 days.

(21) Appl. No.: 11/521,614

(22) Filed: Sep. 15, 2006

(51) Int. Cl.
*A01D 43/00* (2006.01)
(52) U.S. Cl. ........................................... 56/153
(58) Field of Classification Search ............... 56/6, 56/13.6, 13.9, 16.4 R, 153, 503, 51, 192
See application file for complete search history.

(56) References Cited

U.S. PATENT DOCUMENTS

| | | | |
|---|---|---|---|
| 2,906,077 A | 9/1959 | Hale et al. | |
| 3,014,324 A | 12/1961 | McCarthy | |
| 3,443,369 A * | 5/1969 | Zweegers | 56/6 |
| 3,772,865 A * | 11/1973 | Ruprecht et al. | 56/192 |
| 3,905,182 A * | 9/1975 | Geier | 56/13.6 |
| 4,292,790 A * | 10/1981 | Mathews | 56/13.6 |
| 4,330,982 A | 5/1982 | Vissers et al. | |
| 4,487,003 A * | 12/1984 | Mathews et al. | 56/13.6 |
| 4,809,488 A | 3/1989 | Neuerburg et al. | |
| 4,879,870 A * | 11/1989 | Neuerburg | 56/13.6 |
| 5,345,752 A * | 9/1994 | Pruitt et al. | 56/6 |
| 5,430,997 A * | 7/1995 | O'Halloran et al. | 56/6 |
| 5,433,064 A * | 7/1995 | Schmitt et al. | 56/6 |
| 5,463,852 A * | 11/1995 | O'Halloran et al. | 56/6 |
| 5,768,865 A | 6/1998 | Rosenbalm et al. | |
| 5,842,330 A * | 12/1998 | Richardson et al. | 56/6 |
| 5,852,921 A * | 12/1998 | Neuerburg et al. | 56/6 |
| 6,158,201 A | 12/2000 | Pruitt et al. | |
| 6,718,743 B2 * | 4/2004 | Rosenbalm et al. | 56/6 |
| 7,059,108 B1 * | 6/2006 | Rosenbalm et al. | 56/16.4 R |
| 7,165,381 B2 * | 1/2007 | Rosenbalm et al. | 56/6 |

FOREIGN PATENT DOCUMENTS

| | | |
|---|---|---|
| CA | 2166671 | 6/2004 |
| DE | 32 24 170 | 12/1983 |
| DE | 35 01 133 | 7/1986 |
| EP | 0 116 661 B1 | 11/1986 |
| EP | 0 358 045 B1 | 11/1993 |

* cited by examiner

*Primary Examiner*—Árpád Fábián Kovács
(74) *Attorney, Agent, or Firm*—Adrian D. Battison; Michael R. Williams; Ryan W. Dupuis

(57) ABSTRACT

A crop harvesting header has a cutter bar with a plurality of generally horizontal flail disks mounted thereon for driven rotation about generally upright axes spaced along the cutter bar. At least one of the disks is mounted outwardly of the discharge opening and carries an "hour glass" shape impeller to carry the crop inwardly. A pair of conditioner rolls is mounted in the discharge opening and a transfer roller is mounted behind the disks and in front of the nip for transferring the crop upwardly and rearwardly from the disks to the nip. The transfer roller is of the same diameter as the bottom roll and carries high ribs preferably forwardly inclined for an aggressive action on the crop. The roller is mounted with its axis above the cutting plane and its uppermost edge of the ribs at or above the axis of the bottom roll.

19 Claims, 8 Drawing Sheets

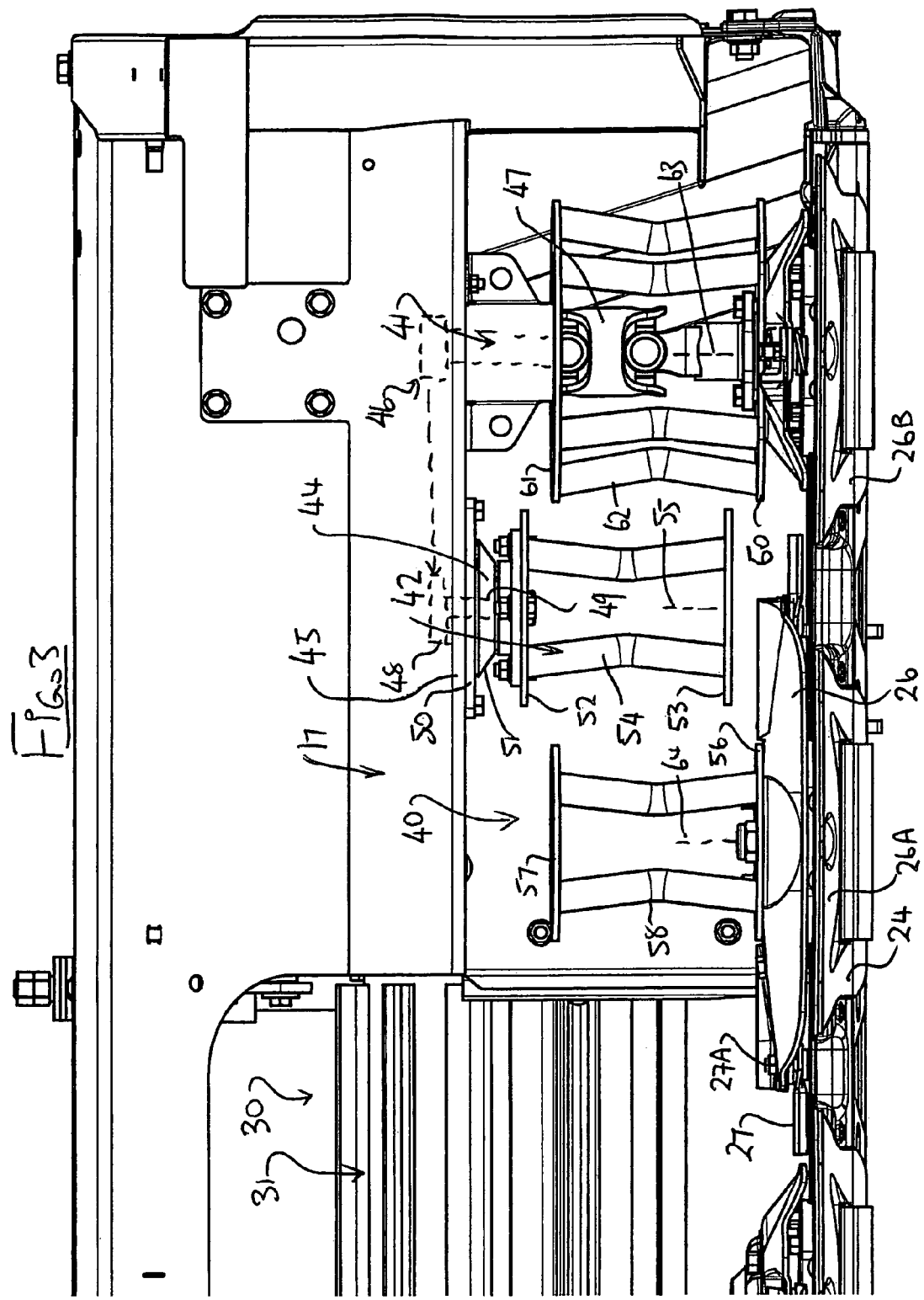

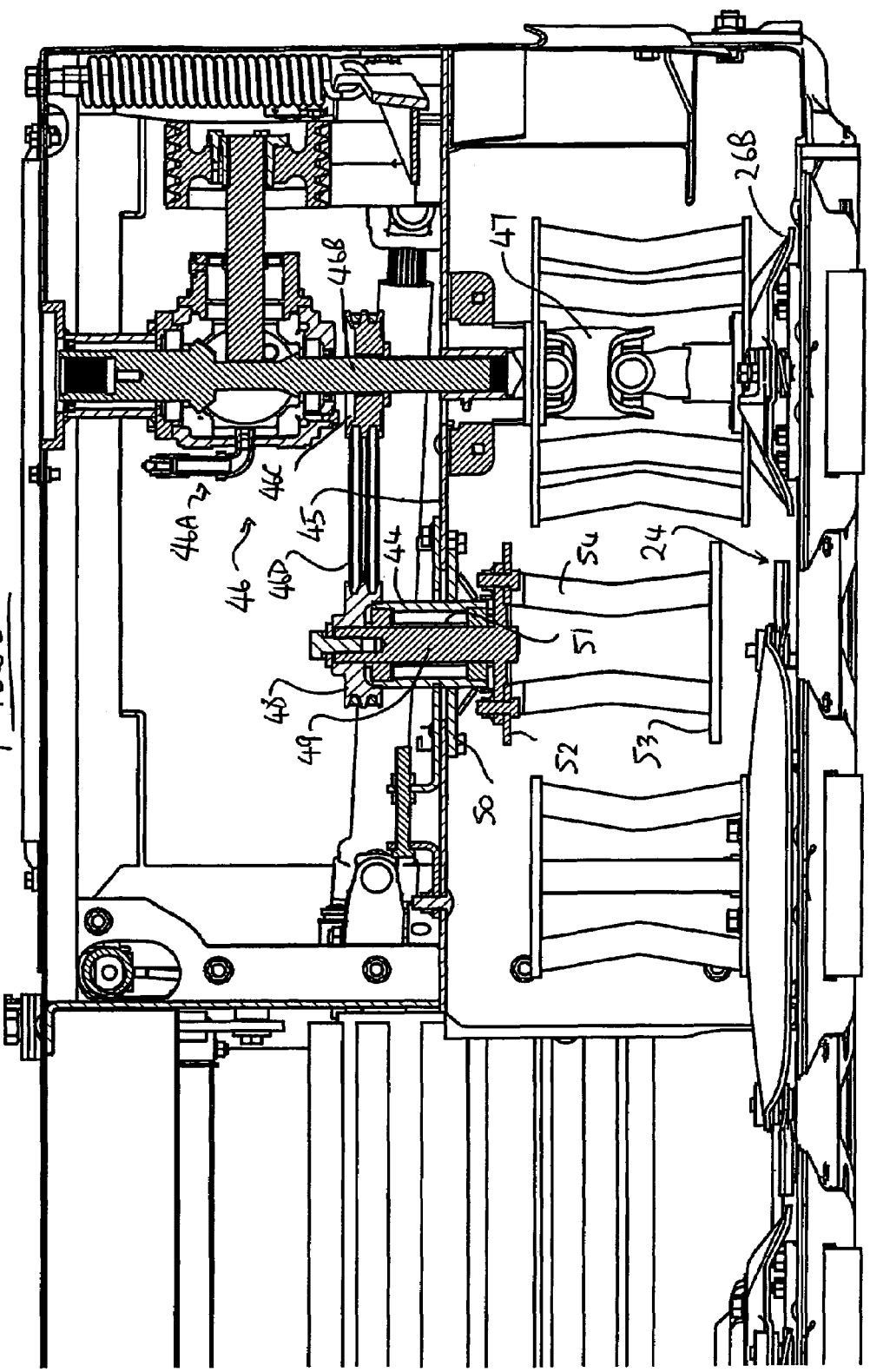

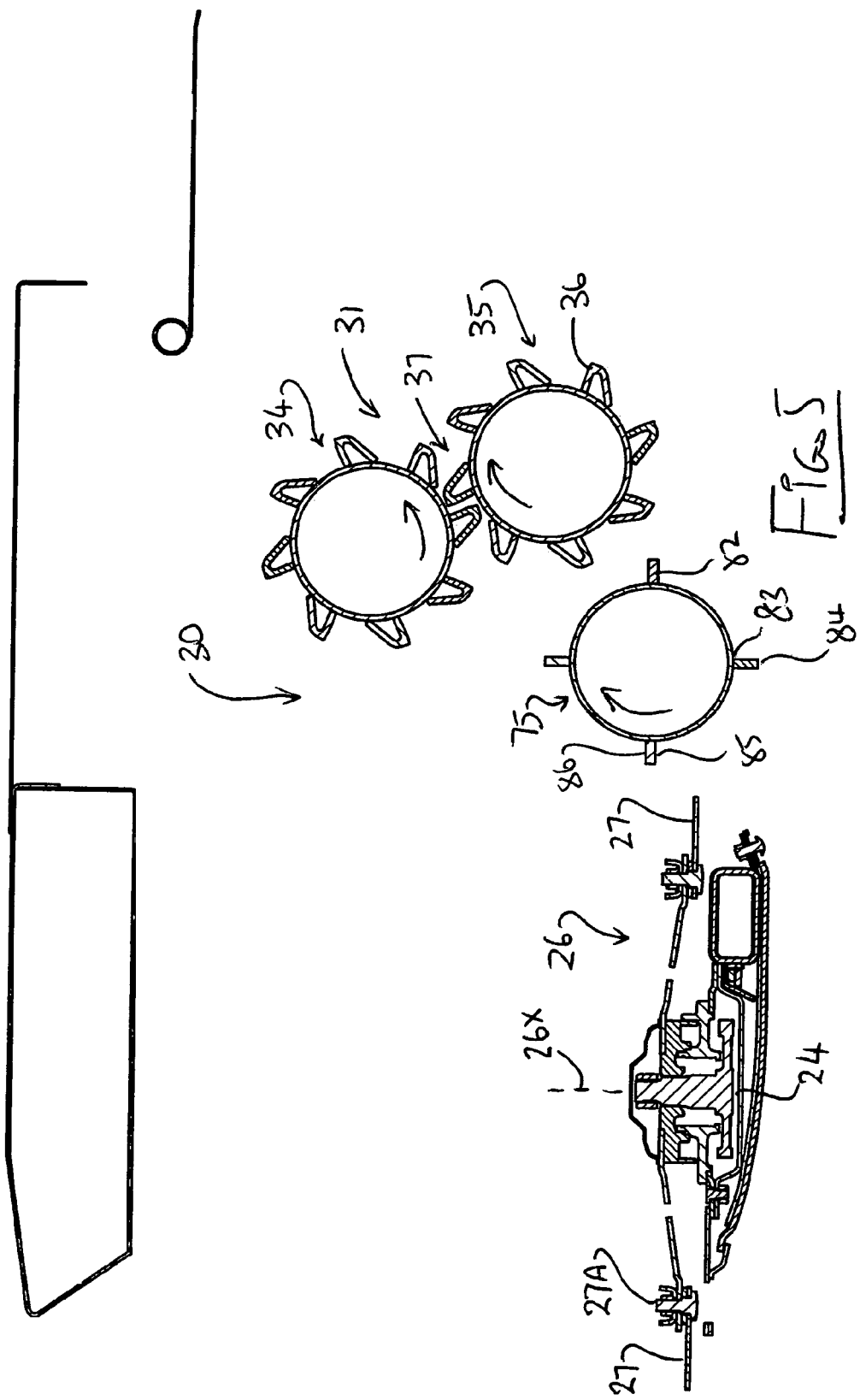

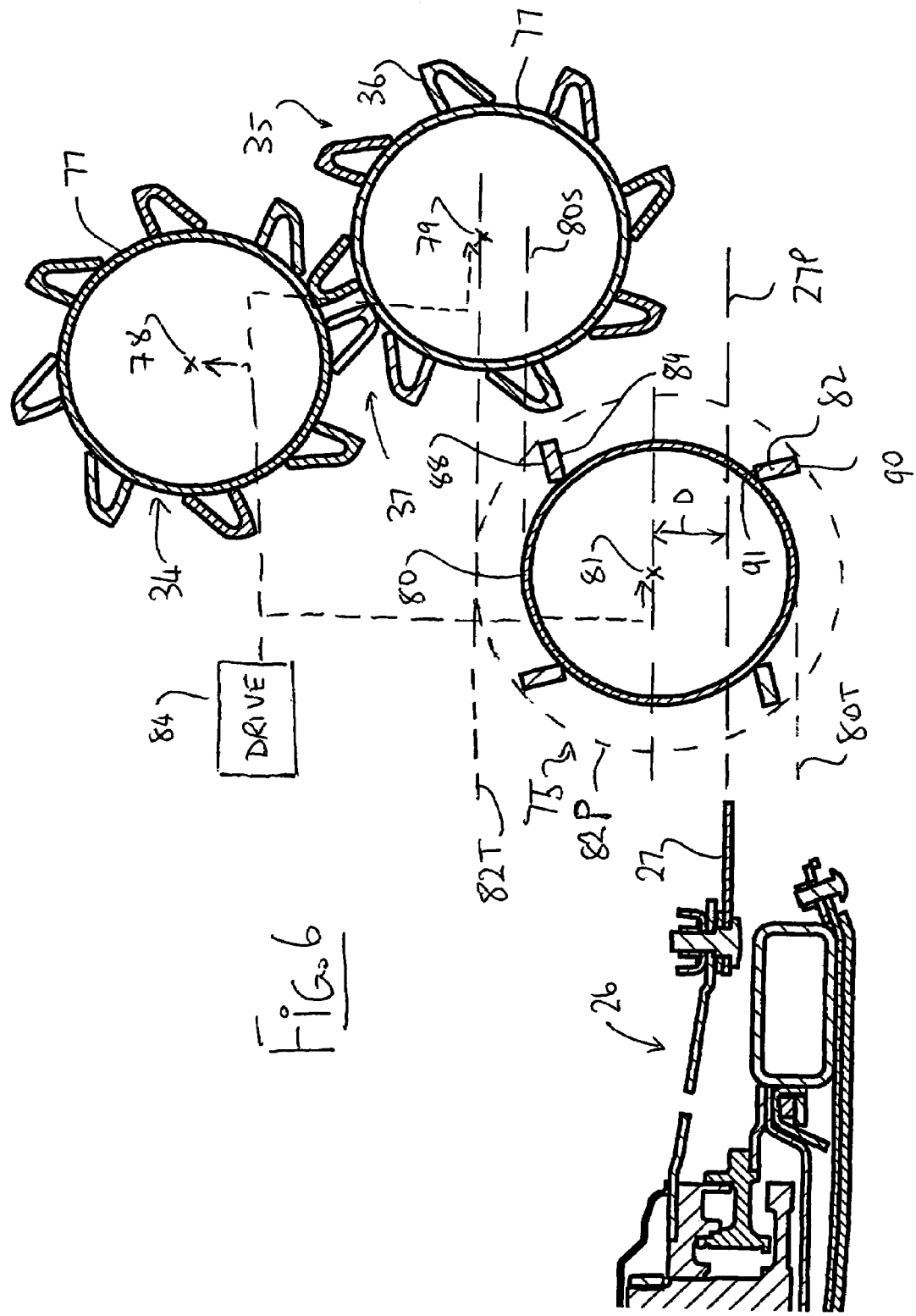

CROP HARVESTING HEADER WITH ROTARY DISKS AND IMPELLERS FOR TRANSFERRING THE CROP INWARDLY TO A DISCHARGE OPENING

This invention relates to a crop harvesting header which has a cutter bar across the width of the header which carries and drives a plurality of transversely spaced rotary disks and particularly to an improved impeller for transferring the cut crop inwardly from outer disks to a discharge opening.

BACKGROUND OF THE INVENTION

Crop harvesting headers which use rotary cutters in replacement for the more conventional sickle knife systems have been available for many years. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about a vertical axis standing upwardly from the cutter bar. The disks carry at a point on their outer edge a plurality, generally two, of flail type blades which rotate with the disk around the vertical axis in a cutting action.

The construction of the cutter bar itself including the suitable gear train is well known and a number of different designs are available which can be used by a person skilled in this art.

Examples of such rotary type cutters are shown in the following documents.

U.S. Pat. No. 5,272,859 (Pruitt) issued Dec. 28, 1993 discloses a mower/conditioner including a cutter bar and rotating disks feeding to a rear discharge opening containing a pair of conditioning rollers. The outermost disk carries a generally cylindrical impeller in the form of an upright cylindrical cage. In front of the discharge opening is a series of disks arranged in counter-rotating pairs.

US published Patent Application 2005/0126142 (Rosenbalm) assigned to Deere which discloses a cage type impeller where the bottom disk of the impeller is formed as a frusto-conical member converging upwardly and inwardly to the cage bars.

U.S. Pat. No. 5,463,852 (O'Halloran) issued Nov. 7, 1995 and U.S. Pat. No. 5,433,064 issued Jul. 18, 1995 (Schmitt) assigned to Hay and Forage Industries of Hesston both show a construction of such a rotary cutter system in which there is a series of the cutter disks at spaced positions across the cutter bar with, at each end, two of the cutter disks extend beyond a central area in front of a discharge opening. In this arrangement the two end disks are driven by a mechanical drive system. The two end disks each carry a rotary transfer element in the form of a series of posts arranged at the periphery of a cylinder surrounding a vertical axis standing upwardly from the disk. The transfer elements act to carry the crop material which is cut by the disks inwardly toward the discharge opening. A conventional crop conditioner in the form of a pair of counter-rotating rollers is mounted across the crop discharge opening.

U.S. Pat. No. 6,158,201 (Pruitt) issued Dec. 12, 2000 also assigned to Hay and Forage Industries discloses a modification to the above 852 and 064 patents of HFI where a crop transport roller is added in the crop discharge opening and is arranged to carry crop up to the nip of the conditioner rollers.

U.S. Pat. No. 5,768,865 (Rosenbalm) issued Jun. 23, 1998 assigned to Deere and Company discloses a rotary cutter system which has two end disks outboard of the central discharge opening with a conditioner arranged at the discharge opening for receiving the cut crop and providing a conditioning action. The conditioner can be either of a flail type or of a fluted roller type.

U.S. Pat. No. 4,809,488 (Neuerburg) issued Mar. 7, 1989 assigned to Kuhn discloses a rotary cutter system which has a frusto-conical cage as the impeller on an end disk where a drive shaft extends into the top of the cage.

EP 358,045 (Ungruh) assigned to Niemeyer Sohne GmbH published Nov. 3, 1993 discloses a mower which has at least four cutting disks arranged in two pairs rotating in the same direction and feeding to the center. Above each disk carries a cylindrical impeller which has a surface running inwardly to carry the crop towards the centre. In the region between each of the disks of each pair is a further cylindrical impeller which assists in transporting the crops to the centre.

German 32 24 170 (Mortl) published Dec. 29, 1983 discloses a header having a discharge opening behind the outermost cutters of a group which includes four cutters. The group is arranged in two pairs with each pair rotating in opposite directions. Thus the outer cutter of the group rotates inwardly. Outboard of this cutter is provided a further cutter which also rotates inwardly as shown by the arrows. This reference also includes a pair of impellers, each mounted on a respective one of the two outer cutters which act as a conveying device for carrying the crop inwardly. The impeller is generally an upwardly tapered element of triangular cross-section.

EP 0 016 661 (Maier) published Nov. 12, 1986 and assigned to Deutz Fahr discloses a cutter bar formed by a series of cutting disks where the end two disks at one end each carry a respective cylindrical impeller for carrying the cut crop to a discharge opening where there is located a conditioner.

German 35 01 133 (Schulze-Selting) published Jul. 17, 1986 also assigned to Deutz Fahr discloses a cutter bar formed by a series of cutting disks where the end disk at one end carries a respective cylindrical impeller for carrying the cut crop to an opening and there is provided an intermediate suspended impeller over the next disk where the suspended impeller is frusto-conical.

U.S. Pat. No. 4,330,982 (Vissers) issued May 25, 1982 and assigned to Multinorm discloses a series of rotary cutters with a pair of conditioning rollers which extend transversely or laterally across the mower narrower than the cutting zone and located in a discharge opening. A roller defines a portion or surface that moves upwardly and rearwardly from the cutting plane to the nip to convey the crop cut by the cutting disks toward the nip.

U.S. Pat. No. 2,906,077 (Hale) issued Sep. 29, 1959 discloses conditioner rollers in front of which is mounted a rotating roller which rotates to feed crop upwardly and rearwardly into the nip. Forwardly of the roller is located a sickle blade type cutter.

U.S. Pat. No. 3,014,324 (McCarty) issued Dec. 26, 1961 discloses a pair of conditioner rollers feeding into a nip therebetween. A roller is located in front of and below the nip of the conditioner roller and rotates in a direction to feed crop into the nip.

Canadian 2,166,671 (Savoie) published Apr. 6, 1997 discloses a disc cutter and a conveyor roller which feeds into the nip between a pair of conditioning rolls located in a discharge opening behind and narrower than the cutter.

From the above prior art patents, it will be noted that it is well known and widely used that each of two outermost disks carries a respective impeller body carried on the disk and driven by the disk about a common generally upright axis. These impeller bodies or members act to carry the crop as it is cut inwardly toward the discharge opening so that the crop can better enter the discharge opening with less chance of blocking or collecting in the area in front of the disks or within the discharge opening.

In many cases the discharge opening contains a conditioner for engaging and breaking or fracturing the crop to improve drying action as the swath is left in the field. Such conditioners can be of a number of different types but one common type uses a pair of fluted rollers which form a nip so that the crop is bent as it passes between the flutes.

Where a crop conditioner is used, a transfer roller is commonly used to lift the crop from the cutting zone to the nip of the conditioner rollers.

The different types of impellers used commonly at the outer cutting disks include drums which are of closed outer wall and cages which are formed of bars at angularly spaced positions around the axis. In most cases the impellers are cylindrical so that the cross section of the impeller is constant along the height of the impeller. In other cases the impeller is tapered so that its diameter decreases as the height increases so that it is either frusto-conical if circular in cross-section or frusto-pyramidical if of square or triangular cross section.

In many cases the impellers are carried on and driven by the disks but in addition intermediate impellers, which are located at a position which is not aligned with one of the disks, can be supported and driven from above as a suspended or hanging impeller. These hanging impellers have the same shapes and construction, that is cylindrical or tapered, as the standing impellers at the disks.

SUMMARY OF THE INVENTION

It is one object of the invention to provide a crop harvesting header of the type having a series of rotary cutting disks on a cutter bar and particularly to provide an improved impeller arrangement for assisting in transferring crop inwardly from one or more outer disks toward the discharge opening.

According to a first aspect of the invention there is provided a crop harvesting header comprising:

a header frame arranged to be transported across ground carrying a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

at least one of the disks being mounted outwardly of the discharge opening such that crop cut thereby must be carried inwardly to the discharge opening;

and at least one impeller mounted at a position at or adjacent the at least one disk for contacting the cut crop;

the impeller being mounted for rotation about a generally upstanding axis;

the impeller having a bottom adjacent the cutter bar and a top spaced from the cutter bar;

the impeller having components thereof at positions thereon extending from the top to the bottom with the components being located around the axis and with the components arranged for engaging the crop, such that rotation of the impeller causes the components in front of the axis to move inwardly of the header such that the engagement of the components with the crop tends to carry the crop inwardly toward the discharge opening;

the components of the impeller being shaped such that a spacing of the components from the axis at a top and bottom of the impeller is larger than a spacing of the components from the axis at a position on the impeller spaced downwardly from the top and spaced upwardly from the bottom.

The components may be separated each from the next angularly of the impeller as in a cage type impeller or may form part of a continuous surface surrounding the axis as in a drum type impeller. Drum type impellers may have additional elements attached to the surface so as to assist in engaging and moving the crop.

Each component of the impeller which engages the crop at the surface of the impeller may be continuous from the top to the bottom of the impeller or it may be formed from separate pieces at different heights on the impeller. This is merely a choice in manufacture and in the most preferable case each component is in the form of a bar along the impeller from top to bottom. However it will appreciate that this mode of manufacture is not essential and the components which engage the crop have different parts at different heights of the impeller. The concept herein is that the components which engage the crop at the position, generally at or adjacent the mid height have a diameter or spacing from the axis which is smaller that at the top and bottom to form in effect an impeller of "hour glass" configuration.

Thus the impellers having the "hour glass" shape defining a "waist" at the mid point are not cylindrical or "generally cylindrical" because their cross-section varies along the length of the impeller.

The use of this "hour glass" concept has shown improvement in crop collection, possibly due to the tendency of the crop to be "centered" on the height of the impeller at the "waist" of the impeller.

Preferably the components are shaped such that they are inclined from the top of the impeller to the central position on the impeller and from the bottom of the impeller to the central position such that the spacing gradually increases. However it is not essential that the inclination be constant or straight and curved shapes may be suitable in some circumstances, provided the narrower "waist" is formed.

Preferably the position is approximately at the mid height of the impeller. However this again is not essential and the "waist" may be closer to the top or the bottom.

Preferably the spacing of the components from the axis, that is the diameter, is the same at the top and the bottom, although one or the other may be larger provide each is larger than the "waist".

Preferably there is provided at least one impeller which is co-axial with a corresponding one of the disks and preferably that impeller is located at the corresponding one of the disks and is driven thereby.

Preferably also there is provided at least one impeller which is separate from the disks and the axis of the impeller is spaced from the axis of each of the disks.

In one particularly preferred arrangement, there are two disks outside the discharge opening and three impellers, where two of the impellers are arranged such that each is co-axial with a corresponding one of the disks and where one of the impellers is separate from the disks and the axis of the impeller is spaced from the axis of each of the disks.

However in an alternative arrangement where there are two disks outside the discharge opening, there may be at least two impellers. In this arrangement one of the impellers is arranged such that it is co-axial with a corresponding one of the disks and the other one of the impellers is separate from the disks and the axis of the impeller is spaced from the axis of each of the disks. However it will be appreciated that the impellers can be mounted either at the disks or separately from the disks provided the impellers are located relative to the disks to carry out the movement function relative to the crop. The arrangement for mounting and driving the disks is a matter of mechanical mounting and drive which is a matter of simple engineering choice based upon selection and cost of bearings and other components and does not affect the function of the impellers.

According to a second preferred aspect of the invention there is provided a crop harvesting header comprising:

a header frame arranged to be transported across ground carrying a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

at least one of the disks being mounted outwardly of the discharge opening such that crop cut thereby must be carried inwardly to the discharge opening;

and at least one impeller mounted at a position at or adjacent the at least one disk for contacting the cut crop;

the impeller being mounted for rotation about a generally upstanding axis;

the impeller having a bottom adjacent the cutter bar and a top spaced from the cutter bar;

the impeller having a plurality of bar members thereon at spaced positions around the axis and arranged for engaging the crop, such that rotation of the impeller causes the bar members in front of the axis to move inwardly of the header such that the engagement of the bar members with the crop tends to carry the crop inwardly toward the discharge opening;

the bar members of the impeller being shaped such that a spacing of the bar members from the axis at a top and bottom of the impeller is larger than a spacing of the bar members from the axis at a position on the impeller spaced downwardly from the top and spaced upwardly from the bottom.

The bar members are preferably simple bars formed from a material which is of constant cross-section and continuous along its length so that the bar can be simply bent into the required "waist" shape. However the bar members may be fabricated from separate pieces connected together either longitudinally or transversely.

Preferably the bar members are shaped such that they are inclined from the top of the impeller to the central position on the impeller and from the bottom of the impeller to the central position such that the spacing gradually increases. However it is not essential that the inclination be constant or straight and curved shapes may be suitable in some circumstances, provided the narrower "waist" is formed.

Preferably the position is approximately at the mid height of the impeller. However this again is not essential and the "waist" may be closer to the top or the bottom.

Preferably the spacing of the bar members from the axis, that is the diameter, is the same at the top and the bottom, although one or the other may be larger provide each is larger than the "waist".

Preferably the bar members are supported on a first end disk member at the top of the impeller and are supported on a second end disk member at the bottom of the impeller and are unsupported therebetween. The disk member may be of any shape such as a planar disk or may be formed with spokes from a central hub at the axis to the separate bar members.

Preferably the bar members are inclined and straight from the top to the position on the impeller and inclined and straight from the bottom to the position on the impeller and are bent at the position.

Preferably the bar members are circular in cross section. However other shapes may be selected to provide different effects on the crop material as the members rotate and move relative to the crop.

Preferably the bar members are constant in cross section since this allows them to be formed from simple elongate material bent to the required "waist" shape. However other constructions can be used.

In one preferred arrangement where there are two disks outside the discharge opening and two impellers are provided where each is co-axial with a corresponding one of the disks, the impeller at an outer one of the two disks is larger in diameter and has more bar members than the impeller at an inner one of the two disks.

BRIEF DESCRIPTION OF THE DRAWINGS

FIG. 3 is a front elevational view of the header of FIG. 1 on an enlarged scale showing one end only of the header, the other end being symmetrical.

FIG. 3A is view similar to that of FIG. 3 showing more detail of the drive components shown only schematically in FIG. 3.

FIG. 5 is a cross sectional view of the discharge opening and conditioning system taken along the lines 5-5 of FIG. 2.

FIG. 6 is a similar cross sectional view to that of FIG. 5 on an enlarged scale showing the inter-relation between the parts and showing a modified arrangement of the transfer roller.

In the drawings like characters of reference indicate corresponding parts in the different figures.

DETAILED DESCRIPTION

Attention is directed to co-pending application Ser. No. 11/087,774 filed Mar. 24, 2005 for BLADE FOR A CROP HARVESTING HEADER WITH ROTARY DISKS, the disclosure of which is incorporated herein by reference to show further details of the cutter disks and blades described hereinafter.

Attention is directed to co-pending application Ser. No. 11/193,631 filed Aug. 1, 2005 for CROP CONDITIONING ROLLER FLUTE SHAPE, the disclosure of which is incorporated herein by reference to show further details of the conditioning rolls described hereinafter.

Figure 1:
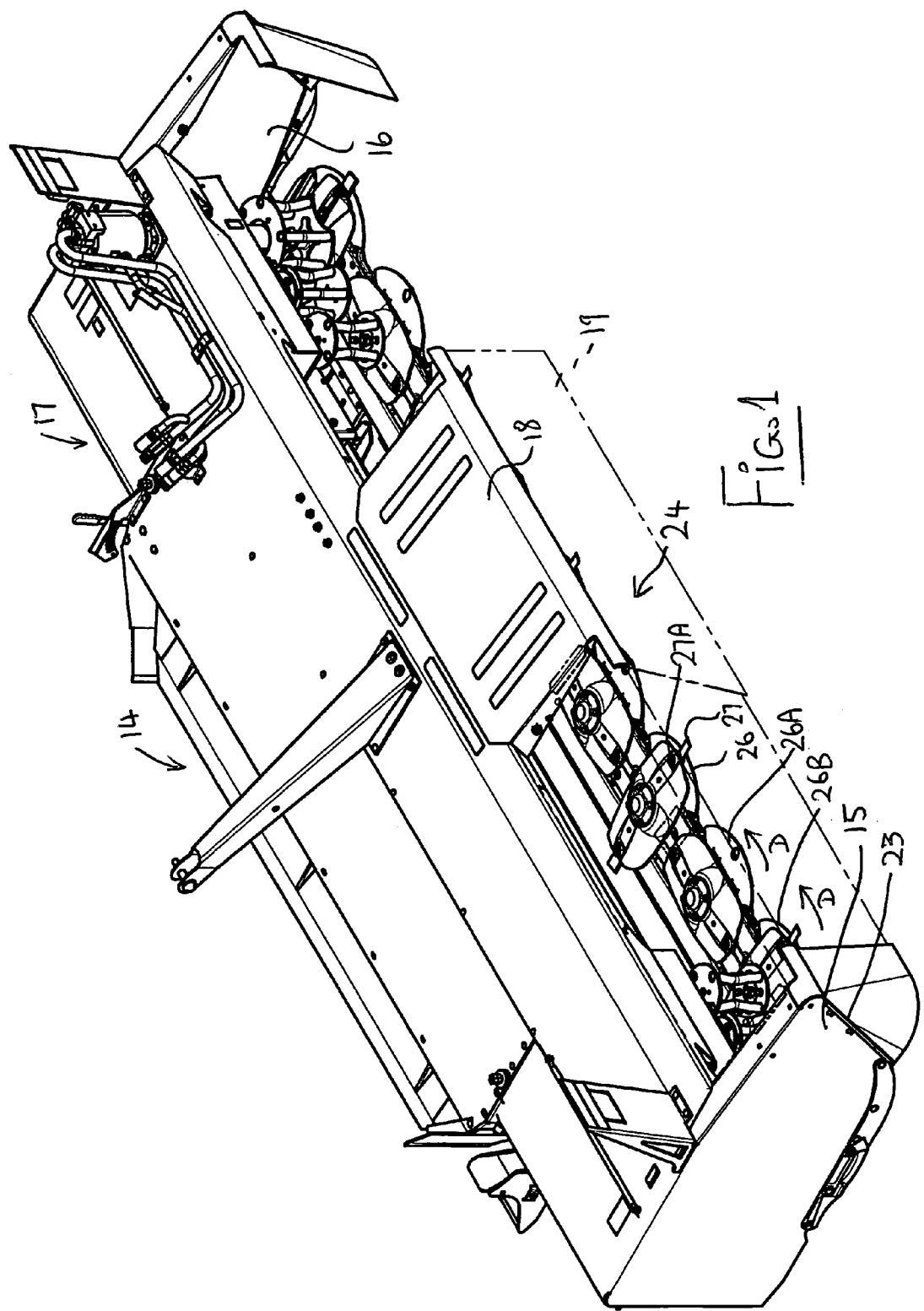
FIG. 1 is an isometric view showing generally a header of the type with which the present invention is preferably concerned.
Figure 2:
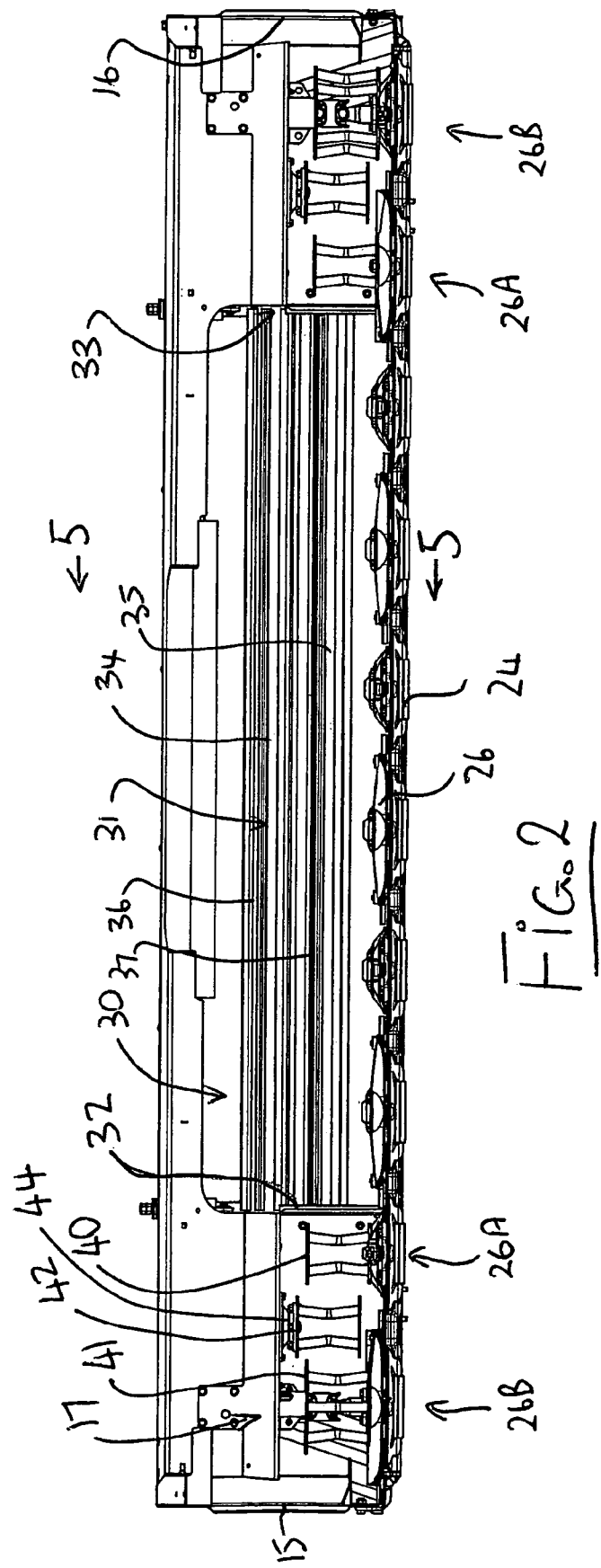
FIG. 2 is a front elevational view of the header of FIG. 1.

In FIG. 1 is shown schematically a header for attachment to conventional swather tractor of the well known type having driven ground wheels and rear castor wheels. A front support assembly of the tractor carries the header 14 including left and right lift arms which carry the header in a floating action across the ground along skid plates (not shown) of the header. The header includes side walls 15 and 16 forming part of a frame 17 attached to the conventional transport system of the tractor. The frame carries top covers 18 which support a front skirt 19 in front of the cutter bar so as to provide protection for persons in the vicinity of the header which could be impacted by objects accelerated by the high speed rotary cutting assembly described hereinafter.

The frame 17 includes a main transverse beam which is attached to the tractor. The main beam carries the side walls 15 and 16. The side walls each comprises a vertical wall extending forwardly to a front edge 23 in front of the cutter bar which is generally indicated at 24. The side wall is vertical and provides the front edge 23 lying in a vertical plane of the side wall so as to confine crop material to the interior of the header between the side walls for cutting action effected by the cutter bar 24.

Within the cutter bar 24 is provided a gear train (not shown) of meshing gears carried on suitable bearings so as to provide communication of drive of a number of vertical shafts carried on the cutter bar each for rotating a generally horizontal disk 26 about a vertical axis of the shaft. The disks are substantially identical. The disks are generally elliptical in shape so that a length between two ends 26A and 26B is significantly greater than a distance between the side edges in a direction at right angles to the length. At each of the ends 26A and 26B is mounted a respective one of a pair of flails 27 each for pivotal movement about a flail mounting pin 27A. The mounting pins are arranged at the ends and thus at the maximum extent of the disk so that the flails project outwardly beyond the edges of the disk for rotation in a common horizontal plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades 27 carried thereby.

The cutter bar is wider than a discharge opening 30 with a conditioning system 31 mounted in the discharge opening 30. Thus the crop material passes over the disks when cut and also must be converged from the full cut width into the discharge opening 30.

The cutter bar of this general construction is of a conventional nature and many examples of a commercial arrangement of this type are available in the market place. Thus the details of the cutter bar and its mounting are well known to one skilled in the art and further details can be obtained from such commercial devices, the details of which are incorporated herein by reference.

The discharge opening 30 has two side walls 32 and 33 which confine the crop material to pass through the discharge opening over a width less than the width of the header so that the side walls 32 and 33 are spaced inwardly from the respective end walls 15 and 16 of the header. The crop conditioning system 31 is arranged to span the width of the crop discharge opening so that the width of the conditioning system is equal to the width of the discharge opening. The conditioning system comprises a top roller 34 and a bottom roller 35 which have flutes 36 arranged in a meshing arrangement as described in more detail hereinafter so that the crop material passing through the discharge opening passes through a nip 37 between the conditioning rolls and is discharged from the rear of the conditioning system as a swath of material to be discharged onto the ground or to be collected as required.

The discs 26 mounted on the cutter bar 24 include a series of discs which are located in front of the discharge opening 30. Outward of these discs and either side is provided a pair of outer discs indicated at 26A and 26B with the disc 26B outermost. These discs are arranged to rotate inwardly so that the front extremity and the blade carried thereby rotates in the direction indicated at the arrows D as shown in FIG. 1 to carry the crop material which is cut by those discs inwardly toward the discharge opening.

Each of the discs 26A and 26B carries a respective one of a plurality of impellers. Thus the disc 26A carries an impeller 40 and the disc 26B carries an impeller 41. In between these two impellers is mounted a third impeller 42.

Thus in the embodiment shown there are three impellers arranged to engage the crop material during or slightly after the cutting action so as to carry the crop material inwardly toward the end wall of the discharge opening. The number of impellers can be increased or decreased depending upon particular requirements or particular designs. Thus there may be only two impellers or there maybe more impellers. The impellers 40 and 41 are mounted on the respective disc so as to be carried thereby and driven thereby. The impeller 42 is carried on the frame 17 at a position above the cutter bar 24 so as to be a hanging impeller supported from a mounting system 44 above the impeller wherein there is provided a suitable bearing and also a suitable drive system within a frame member of the frame 17.

While the impellers 40 and 41 are mounted on the respective discs to be driven thereby, in an alternative arrangement, the impellers may be hanging impellers in the style of arrangement shown at impeller 42.

The impellers 40 and 41 are directly co-axial with the respective disc, 26A and 26B. Hanging impellers to replace these impellers may be also co-axially arranged with the corresponding disc or the axes of the impellers may be offset from the axes of the discs. It will be appreciated that the discs and the impellers co-operate to assist in carrying the crop material inwardly toward the discharge opening and to resist the crop material from moving rearwardly over the discs 26A and 26B to a rear bulkhead panel which could cause collection of the crop material and eventual blockage of the system.

As shown in more detail in FIGS. 3 and 3A, the frame 17 includes a frame member 45 within which is mounted a drive shaft and drive system generally indicated at 46 and shown in more detail in FIG. 3A. This drive system 46 provides drive through a gear box 46A to a drive shaft 46B and drive link 47 to the end disc 26B to provide drive into an end gear of the cutter bar 24. The drive 46 also provides a drive communication by a pulley 46C and belt 46D to a drive coupling 48 which is connected to a drive shaft 49 of the hanging impeller 42. The mounting 44 of the hanging impeller 42 includes a base plate 50 attached to the frame member or plate 45 together with a bearing arrangement 51 through which the shaft 49 passes.

The hanging impeller comprises a top plate 52 and a bottom plate 53 defining top and bottom ends of the impeller 42 respectively. Between these end plates 52 and 53 is provided a series of bars 54 at spaced positions around an axis 55 of the impeller 42.

Figure 4:
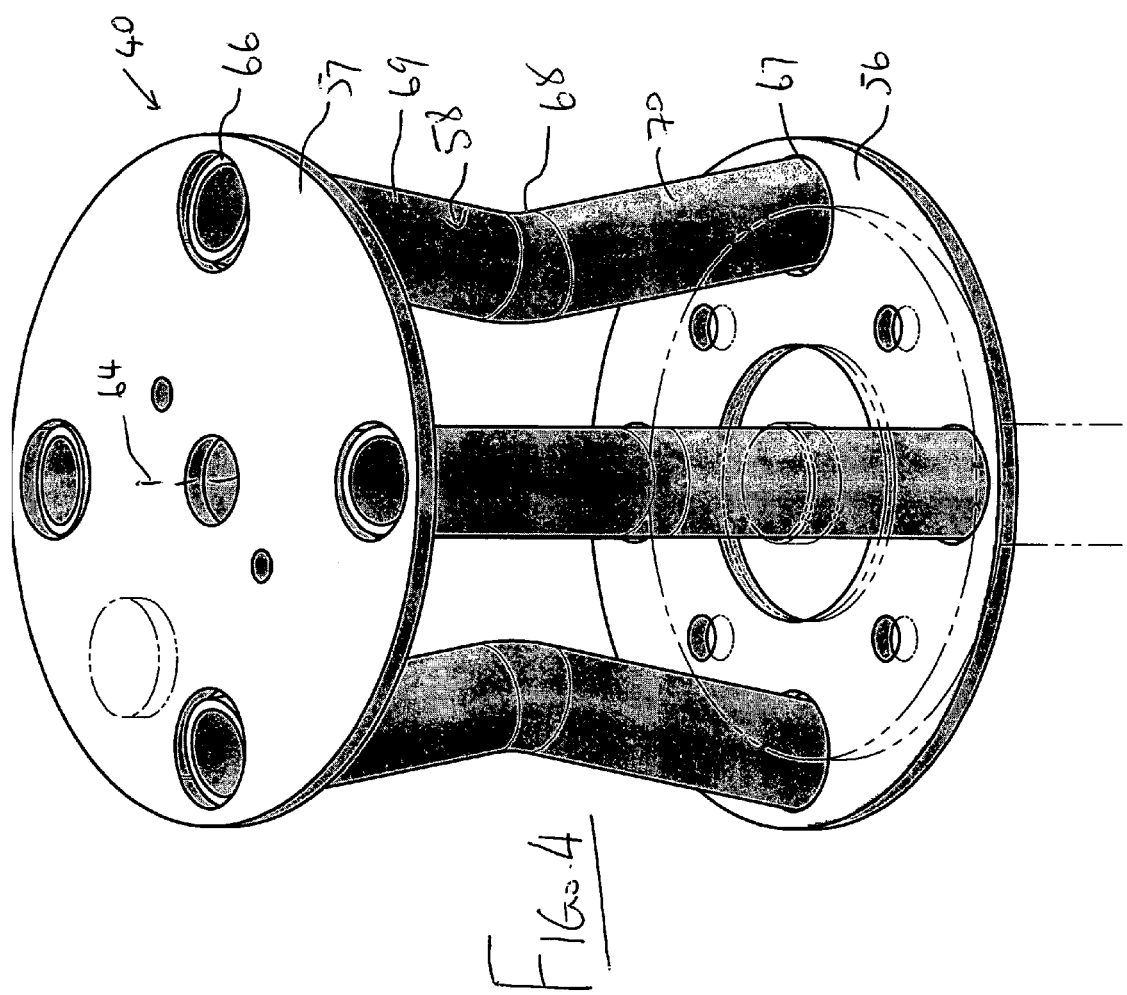
FIG. 4 is an isometric view of the impeller 40 of FIGS. 2 and 3.

The impeller 40 shown in FIG. 4 similarly comprises a bottom plate 56 and a top plate 57. In this arrangement the bottom plate 52 is bolted directly onto the top of the respective disc 26A. The top plate 57 is thus supported at a spaced position from the bottom plate 56 by the upstanding bars 58 which connect the top and bottom plates. The bars 54 are substantially identical to the bars 58 providing impellers 42 and 40 which are substantially identical in height and diameter. However this relationship is not essential and these impellers maybe of different dimensions and constructions.

Figure 4A:
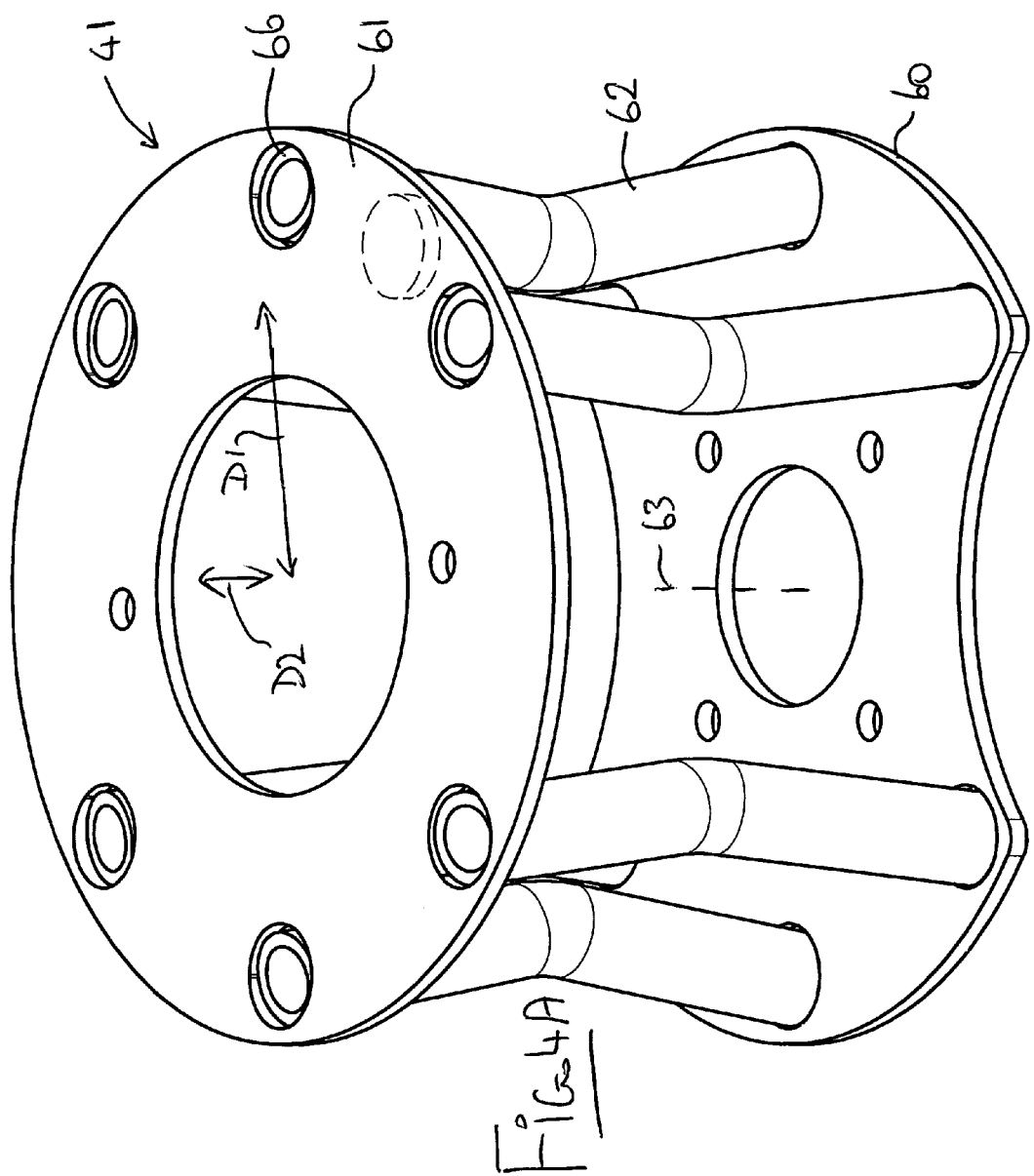
FIG. 4A is an isometric view of the impeller 41 of FIGS. 2 and 3.

The impeller 41 shown in FIG. 4A is similar to the impeller 40 in that it includes a base plate 60 bolted to the top of the end disc 26B. The impeller further includes a top plate 61 and a series of bars 62. The height of the impeller, 41 that is the distance between the top and bottom plate, is equal to the height of the other impellers. In this way the top and bottom plates of the impeller 40 and 41 are aligned in height across the width of the header.

However the impeller 41 is oval in that it is larger in dimension in a direction D1 than the diameter of the impeller 40 relative to its axis 63 and is equal in dimension, in a direction D2 at right angles to the first direction D1, to the diameter of the impeller 40. The bars 58 on the impeller 40 58 are angularly spaced around the respective axis 64 with the distance between the bars being substantially equal. The bars 62 on the impeller 41 are located at a greater diameter from the axis 63 than the bars 58 on the impeller 40 and there are a larger number of the bars 62 than bars 58. Thus the impeller 40 as shown in more detail in FIG. 4 has only four bars at 90° spacing whereas the impeller 41 has six bars at 450 spacing at a larger diameter. As the impeller 41 is oval in plan, the bars 62 are not equidistantly spaced around the full periphery but are arranged in groups of three at the ends of the larger dimension with a larger spacing along the sides at the smaller dimension.

As best shown in FIGS. 4 and 4A, each of the bars 58 and 62 of the impellers 40 and 41 has a top end 66 at the top plate 57 and a bottom end 67 at the bottom plate 56. The top and bottom ends are suitably fastened to the top and bottom discs and in the embodiment shown this is effected by providing a hole in the respective disc within which the respective end is located. In the embodiment shown each of the bars 58 is formed by a tubular member of circular cross section. Each of the bars is bent at a central location 68 so as to form two inclined portions 69 and 70 which extend from the bent center section 68 upwardly to the top end and downwardly to the bottom end respectively. The bend is located so that the center of the bar is spaced inwardly toward the axis relative to the corresponding top and bottom ends. Each of the bars lies in an axial plane of the impeller. This forms for the impeller in effect a waist at the mid height between the top and bottom ends. The waist thus forms in effect a circle surrounding the impeller which is narrower than the bars at the top and bottom extremity. In this way the impeller is "hour-glass" shape with the waist formed at the mid height.

As the top and bottom plates of the impellers 40 and 41 are at the same height, the waist at the center is similarly located at the same height.

The impeller 42 is identical in size and construction to the impeller 40 but is located in a hanging arrangement from the upper rail 45 with the top and bottom plates raised slightly relative to the top and bottom plates of the impellers 40 and 41. Thus the central waist of the impeller 42 is at a raised height relative to the waists of the impellers 40 and 41.

In one example of the impeller 40 the amount of bending of the bars is such that a circle surrounding the bars at the waist is of the order of 15.5 cm in diameter as opposed to a circle surrounding the bars at the top and bottom ends which is 19 cm in diameter.

The bars are not necessarily circular in cross section and can be of different shapes to provide a more aggressive engagement with the crop. The circular cross section bars provide an action on the crop which is relatively non-aggressive so that it reduces the tendency of the impeller to grasp and hold portions of the crop which provides a tendency for wrapping of the crop around the impeller as it rotates. The smooth surfaces provided by the bars allows the crop to sweep over those surfaces as it moves inwardly away from each of the impellers toward the discharge opening. There are no sharp edges on the impeller bars which could act to cut into the crop and cause an engagement point tending to hold the crop against its required movement away from the impeller.

As the crop moves inwardly toward the discharge opening, the crop tends to lie with the stalks across the front of the header. The shaping of the impeller with the narrower waist thus tends to cause the crop to be cupped within the outer surface of the impeller so that less tendency for the crop materials to climb above the impellers. The crop material thus is cradled by the bars of the impellers as the crop material moves inwardly with the crop material tending to center at the central waist of the impellers. This arrangement has therefore provided an improved crop flow across the front of the impellers as the impellers rotate inwardly across their front surfaces toward the discharge opening.

Turning now to FIG. 5, there is shown in cross section the components within the discharge opening 30 which are located behind the discs 26 and the cutting blades 27. Thus there is provided the top conditioning roller 34 which is located above the bottom conditioning roller 35. These define between them the nip 37 through which the crop material is controlled to pass. In order to assist the crop material from the cutting discs to flow to the nip 37, there is provided a crop transfer roller 75 which is located in the area between the rear of the discs and the nip of the conditioning roller system.

Thus the horizontal cutter disks 26 are mounted on the cutter bar 24 at positions spaced transversely of the header with the disks 26 being mounted on the cutter bar for driven rotation about respective generally upright axes 26X spaced along the cutter bar. The cutter blades 27 are arranged substantially in a common cutting plane 27P generally parallel to the ground. The disks 26A and 26B are mounted outwardly of the discharge opening 30 such that the width of the cutter bar is greater than the width of the discharge opening and such that crop cut must be carried thereby inwardly to the discharge opening.

The top conditioning roll 34 and the bottom conditioning roll 35 are parallel and arranged such that the crop passes through the nip 37 between the top and bottom conditioning rolls. The top and bottom conditioning rolls are arranged such that the nip 37 is raised above the common cutting plane 27P and is located behind the disks 26. The transfer roller 75 is mounted behind the disks and in front of the nip for transferring the crop upwardly and rearwardly from the disks to the nip. The top and bottom conditioning rolls 34, 35 each comprising a cylindrical body 77, mounted for rotation about an axis 78, 79 thereof. In one example, on the cylindrical body 77 is mounted a series of longitudinally extending, angularly spaced flutes 36 arranged such that the flutes 36 of the top roll 34 mesh with the flutes of the bottom roll 35 in the conditioning action, as is well known.

However the present invention is also applicable to conditioning rolls of the type which have no flutes or ribs so that the conditioning action is effected by a high crushing force between two plane rollers. The rollers can be smooth or may include grooves or indentations which are not intended to mesh in the crushing action. Crushing conditioner rolls of this type are well known to persons skilled in this art and different designs may be selected and used as will be known to such persons.

The transfer roller 75 also comprises a cylindrical body 80 having a cylindrical outer surface mounted for rotation about an axis 81 thereof. On the body 80 is mounted a series of longitudinally extending, angularly spaced ribs 82.

The cylindrical body 80 of the transfer roller 75 has a diameter which is at least equal to the diameter of the cylindrical bodies 77 and 78 of the top and bottom conditioning rolls. As shown the diameters are equal. The roller is not smaller than the rolls. It may be slightly larger but only by a small difference. In one example all the bodies 77 and 80 are of the same size and are 16.8 cms in diameter. Diameters in the range plus or minus 20% of this value would generally be suitable.

The rolls 34 and 35 and the roller 75 are driven by a drive system schematically indicated at 84 so that the transfer roller 75 is rotated at a rotation rate in rpm which is less than a rotation rate in rpm of the top and bottom conditioning rolls 34 and 35. This rate of rotation is selected so as to provide the best transfer of the crop material and is preferably in the range 50% to 90% of the rate of the conditioner rolls which is generally of the order of 1000 rpm. In one example a rate of rotation of the transfer roller which is 66% of the rate of the conditioner rolls or of the order of 666 rpm has been found to be suitable.

Each rib 82 comprises an elongate metal bar which is rectangular in cross-section to define an inner surface 83 welded to the cylindrical body 80 of the roller 75 so as to extend along the full length of the body. The bar may lie in an axial plane or may be slightly helical along the cylindrical body. The bar defines an outer surface 84 spaced from the cylindrical surface and a leading side surface 86 and a trailing side surface 85. A height of the outer surface 84 from the cylindrical surface is greater than a width of the bar between the side surfaces 85, 86. The height of the outer edge 84 from the cylindrical surface is desirably greater than 1.5 cms and preferably in the range 1.9 cms to 3.8 cms and more preferably of the order of 2.5 cms. This defines a rib 82 which is aggressive in its action in engaging the crop to provide a vigorous forwarding action. The number of ribs as shown is four at 90 degree spacing although this may be changed if a greater or less aggressive action is required.

The transfer roller 75 is located such that the axis of the transfer roller is above the cutting plane 27P. That is the axis is not aligned with the cutting plane 27P nor is it generally aligned but it is significantly higher than the cutting plane. This positioning of the axis of the roller allows a larger roller to be used with bars of larger height. The axis 81 of the transfer roller 75 is above the common cutting plane 27 of the blades by a distance of at least 4 cms and preferably in the range 4.5 to 7.5 cms. A height of preferably of the order of 5.0 cms above the cutting plane has been found to be effective.

A lowermost tangent 80T of the cylindrical body 80 of the transfer roller 75 is however below the cutting plane 27P. An uppermost tangent 82T to a path 82P of travel of the outermost surface of the ribs 82 of the transfer roller 75 is at or above the axis 79 of the bottom conditioning roll 35 and below the nip 37.

An uppermost tangent 80S of the cylindrical body 80 of the transfer roller 75 is below the axis 79 of the bottom conditioning roll 35.

In FIG. 5 the ribs 82 are arranged such that the side surfaces 85, 86 of each extend generally at right angles to the cylindrical body. That is the rib projects directly outwardly from the body generally in an axial plane of the body. As an alternative and preferable arrangement shown in FIG. 6, the ribs are arranged such that the side surfaces 88 and 89 are inclined relative to an axial plane of the roller through the inner surface and such that the outer surface 90 is angularly advanced relative to the inner surface 91. This arrangement yet further increases the aggressive action of the bars on the crop material so as to drive the crop more vigorously from the cutting plane upwardly and rearwardly toward the nip.

The waist or narrowest intermediate location on the impellers 40 and 41 is located at a height so that it is above the horizontal plane containing the axis of the transfer roller and below the horizontal plane containing the axis of the top roller. In this way it locates or tends to locate the crop generally in this zone for better feeding between the transfer roller and the top conditioner roll so as to better enter the nip.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting header comprising:
    a header frame arranged to be transported across ground on which there is a standing crop for harvesting;
    a cutter bar mounted on the header frame across a width of the header for movement across the ground for harvesting the standing crop;
    a plurality of generally horizontal cutter disks mounted on the cutter bar at positions spaced transversely of the header with the disks being mounted on the cutter bar for driven rotation about respective generally upright axes spaced along the cutter bar;
    each disk having mounted thereon at a position spaced outwardly from the respective axis thereof at least one cutter blade such that rotation of the disk about its axis causes a standing crop to be cut by the blade as it rotates around the axis on the disk;
    the header frame defining a discharge opening through which the cut crop is discharged for forming a swath behind the header;
    at least one of the disks being mounted outwardly of the discharge opening such that crop cut thereby must be carried inwardly to the discharge opening;
    at least one first impeller mounted at a position at or adjacent the at least one disk for contacting the cut crop;

and at least one second impeller separate from the disks with the axis of the second impeller being spaced from the axis of each of the disks;

each of the first and second impellers being mounted for rotation about a generally upstanding axis;

each of the first and second impellers having a bottom adjacent the cutter bar and a top spaced from the cutter bar;

each of the first and second impellers having components thereof at positions thereon extending from the top to the bottom with the components being located around the axis and with the components arranged for engaging the crop, such that rotation of the impeller causes the components in front of the axis to move inwardly of the header such that the engagement of the components with the crop tends to carry the crop inwardly toward the discharge opening;

the components of each of the first and second impellers being shaped such that a spacing of the components from the axis at the top and bottom of the impeller is larger than a spacing of the components from the axis at an intermediate position on the impeller spaced downwardly from the top and spaced upwardly from the bottom.

2. The header according to claim 1 wherein the components are shaped such that they are inclined from the top of the impeller to said intermediate position on the impeller and from the bottom of the impeller to said intermediate position such that the spacing gradually increases.

3. The header according to claim 1 wherein the intermediate position is approximately at a mid height of the impeller.

4. The header according to claim 1 wherein the spacing of the components from the axis is the same at the top and the bottom.

5. The header according to claim 1 wherein there is provided at least one first impeller which is co-axial with a corresponding one of the disks.

6. The header according to claim 5 wherein the first impeller is located at the corresponding one of the disks and is driven thereby.

7. The header according to claim 1 wherein there are two disks outside the discharge opening and three impellers, where two of the impellers are said first impellers arranged such that each is co-axial with a corresponding one of the disks and where one of the impellers is said second impeller separate from the disks and the axis of the impeller is spaced from the axis of each of the disks.

8. The header according to claim 1 wherein there are two disks outside the discharge opening and two impellers, where one of the impellers is said first impeller arranged such that it is co-axial with a corresponding one of the disks and where one of the impellers is said second impeller separate from the disks and the axis of the impeller is spaced from the axis of each of the disks.

9. The header according to claim 1 wherein the each of the components is continuous from the top to the bottom of the impeller.

10. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

at least one of the disks being mounted outwardly of the discharge opening such that crop cut thereby must be carried inwardly to the discharge opening;

and at least one impeller mounted at a position at or adjacent the at least one disk for contacting the cut crop;

the impeller being mounted for rotation about a generally upstanding axis;

the impeller having a bottom adjacent the cutter bar and a top spaced from the cutter bar;

the impeller having at least four bar members thereon at spaced positions around the axis and arranged for engaging the crop, such that rotation of the impeller causes the bar members in front of the axis to move inwardly of the header such that the engagement of the bar members with the crop tends to carry the crop inwardly toward the discharge opening;

the impeller being open between the bar members such that a peripheral surface of the impeller for engaging the crop consists solely of the bar members;

the bar members of the impeller being shaped such that a spacing of the bar members from the axis at the top and bottom of the impeller is larger than a spacing of the bar members from the axis at an intermediate position on the impeller spaced downwardly from the top and spaced upwardly from the bottom.

11. The header according to claim 10 wherein the bar members are shaped such that they are inclined from the top of the impeller to said intermediate position on the impeller and from the bottom of the impeller to said intermediate position such that the spacing gradually increases.

12. The header according to claim 10 wherein the intermediate position is approximately at a mid height of the impeller.

13. The header according to claim 10 wherein the spacing of the bar members from the axis is the same at the top and the bottom.

14. The header according to claim 10 wherein the bar members are supported on a first end disk member at the top of the impeller and are supported on a second end disk member at the bottom of the impeller and are unsupported therebetween.

15. The header according to claim 10 wherein the bar members are inclined and straight from the top to the position on the impeller and inclined and straight from the bottom to the position on the impeller and are bent at the intermediate position.

16. The header according to claim 11 wherein the bar members have an outer periphery which is circular in cross-section.

17. The header according to claim 11 wherein the bar members have an outer periphery which is constant in cross section.

18. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

at least one of the disks being mounted outwardly of the discharge opening such that crop cut thereby must be carried inwardly to the discharge opening;

and at least one impeller mounted at a position at or adjacent the at least one disk for contacting the cut crop;

the impeller being mounted for rotation about a generally upstanding axis;

the impeller having a bottom adjacent the cutter bar and a top spaced from the cutter bar;

the impeller having a plurality of bar members thereon at spaced positions around the axis and arranged for engaging the crop, such that rotation of the impeller causes the bar members in front of the axis to move inwardly of the header such that the engagement of the bar members with the crop tends to carry the crop inwardly toward the discharge opening;

the bar members of the impeller being shaped such that a spacing of the bar members from the axis at the top and bottom of the impeller is larger than a spacing of the bar members from the axis at an intermediate position on the impeller spaced downwardly from the top and spaced upwardly from the bottom;

wherein there are two disks outside the discharge opening and two impellers arranged such that each is co-axial with a corresponding one of the disks and where the impeller at an outer one of the two disks is larger in diameter and has more bar members than the impeller at an inner one of the two disks.

19. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

at least two of the disks at one end of the discharge opening being mounted outwardly of the discharge opening such that crop cut thereby must be carried inwardly to said one end of the discharge opening;

at least two impellers mounted adjacent said one end of the discharge opening for engaging the crop with an outer one of the impellers mounted outwardly of an inner one of the impellers so as to carry the crop inwardly to said one end of the discharge opening;

each of the impellers being mounted for rotation about a generally upstanding axis both in a common direction such that an outer periphery of the impellers in front of the impellers moves inwardly tending to carry crop inwardly across the front of the impellers toward said one end of the discharge opening with the crop being discharged from the inner one of the impellers inwardly into the discharge opening;

each of the impellers having a bottom adjacent the cutter bar and a top spaced from the cutter bar;

each of the impellers having components thereof at positions thereon extending from the top to the bottom with the components being located around the axis and with the components arranged for engaging the crop, such that rotation of the impeller causes the components in front of the axis to move inwardly of the header such that the engagement of the components with the crop tends to carry the crop inwardly toward the discharge opening;

the components of each of the impellers being shaped such that a spacing of the components from the axis at the top and bottom of the impeller is larger than a spacing of the components from the axis at an intermediate position on the impeller spaced downwardly from the top and spaced upwardly from the bottom.

\* \* \* \* \*